H. HESS.
DRIVE CHAIN.
APPLICATION FILED OCT. 16, 1908.
1,151,587.
Patented Aug. 31, 1915.
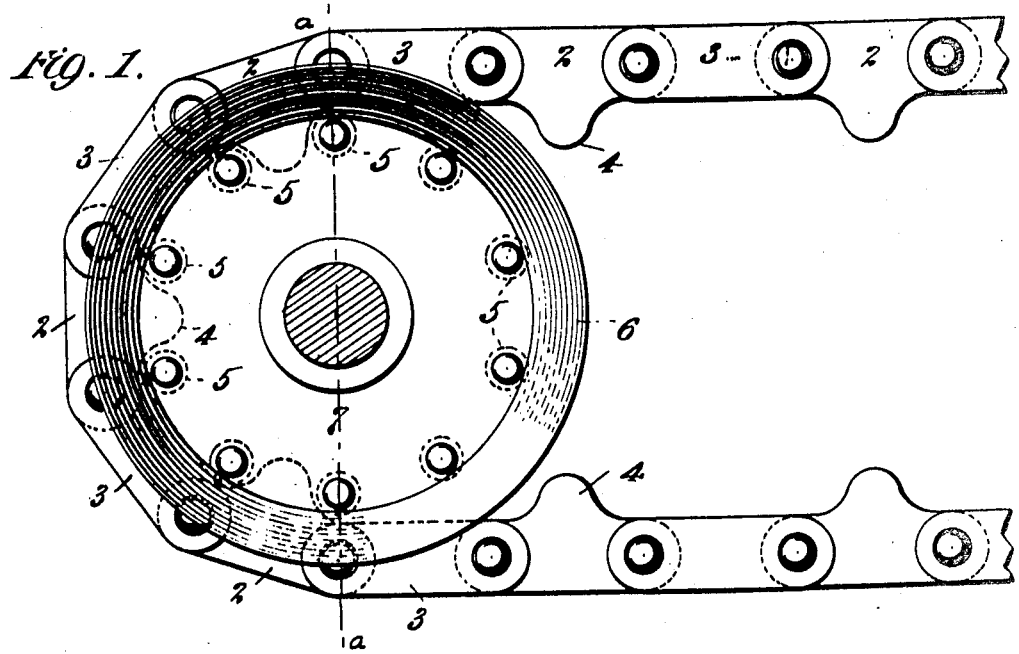
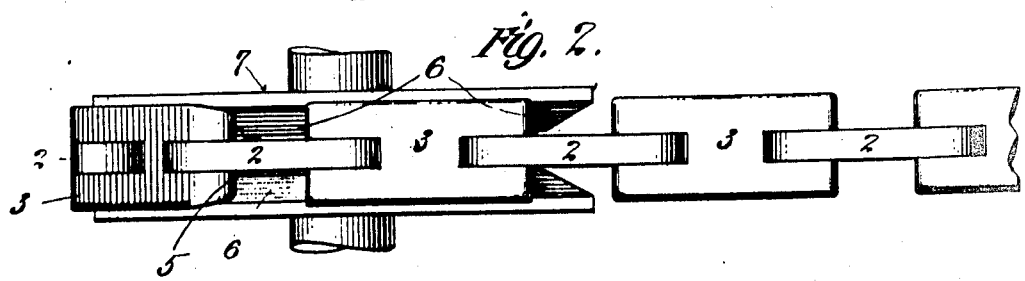
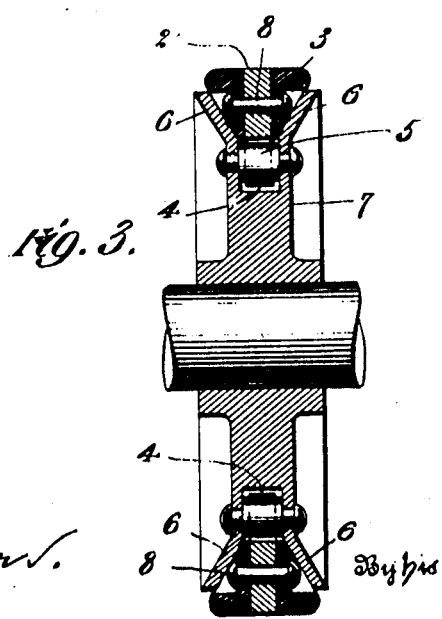
Witnesses:
Inventor:
HENRY HESS,
By his Attorneys
Rogers & Kennedy

UNITED STATES PATENT OFFICE.

HENRY HESS, OF WAWA, PENNSYLVANIA.

DRIVE-CHAIN.

1,151,587.

Specification of Letters Patent. Patented Aug. 31, 1915.

Application filed October 16, 1908. Serial No. 458,010.

*To all whom it may concern:*

Be it known that I, HENRY HESS, a citizen of the United States, residing at Wawa, in the county of Delaware and State of Pennsylvania, have invented certain new and useful Improvements in Drive-Chains, of which the following is a specification, reference being had therein to the accompanying drawing.

This invention relates to drive chains in which the links are formed to engage lugs or projections on the wheel, by which means the latter is driven positively by the chain, the objects of the invention being to aid the positive driving action of the chain and also to cushion the engagement of the parts, so as to prevent noise or rattling.

With these ends in view, my invention consists in so forming the links of the chain, that in addition to their positive driving action on the wheel, the links will act with a frictional effect or "grip," with the result that the wheel will be subjected to both a positive and frictional driving action, the frictional action serving to cause the parts to engage with a cushioning effect, thereby preventing rattling or click, and providing a silent running "drive."

In the accompanying drawings: Figure 1 is a side elevation of a sprocket-wheel, and a section of driving chain embodying my invention; Fig. 2 is a top plan view of the same; Fig. 3 is a vertical transverse section on the line a—a of Fig. 1.

Referring to the drawings: In the embodiment of the invention illustrated, the chain 1 consists of alternately arranged positive driving links 2, and frictional driving links 3, jointed together end to end, the links 2 being provided with inwardly extending projections or teeth 4, adapted to engage between lugs or pins 5, extending between walls 6 of a peripheral groove in the wheel 7, the engagement of the teeth with the pins causing the wheel to be driven with a positive action. The frictional driving links 3 are of such form in cross-section that they will fit closely between the walls of the peripheral groove, so as to bind or wedge therein to a degree sufficient to exert a "grip" on the walls, and thereby aid the positive driving action of the teeth on the pins. As shown more particularly in Fig. 3, the walls of the groove slope or flare outward, and the links 3 are beveled or inclined at their sides to bear flatly against the sloping walls and act with a wedging action therebetween, these links being preferably formed of some yielding material in order that they may act with a cushioning effect to deaden the contact of the parts and thereby prevent rattling or click. In their preferred construction the frictional links are in the form of blocks of some durable but slightly yielding or cushioning material, the ends of which are provided with open slots in which the ends of the connecting positive driving links 2 are seated and pivoted by means of transverse pivot pins 8, the heads of which are countersunk so as not to engage the walls of the groove. The links 2 are preferably in the form of flat metal plates with the driving teeth formed integral therewith, as shown in Fig. 1.

It is manifest that my invention is not restricted to the specific embodiment shown, either as regards the type of chain or wheel, and it is to be understood that the invention is not limited to any specific form or arrangement of the parts, except in so far as such limitations are specified in the claims.

Having thus described my invention, what I claim and desire to secure by Letters-Patent of the United States is as follows:

1. In combination with a wheel having driving lugs, a driving chain comprising positive driving elements and frictional driving elements jointed to the first mentioned elements, the said positive driving elements engaging the lugs and acting on the wheel with a positive driving action only, and the said frictional driving elements engaging the wheel and acting thereon with a frictional driving action only.

2. A driving chain comprising connected links, certain of said links being formed of hard unyielding material and adapted to engage and drive a wheel with a positive driving action, and other of the links being formed of a yielding material and adapted to engage and drive the wheel with a frictional driving action.

3. In combination with a wheel formed with a peripheral groove and transverse driving pins extending between the walls of the grooves at intervals, a drive chain comprising connected links, the alternate links being provided with frictional surfaces adapted to engage the walls of the peripheral groove and acting to drive the wheel with a frictional action, and the other
5 links being provided with inwardly extending teeth adapted to engage the pins and drive the wheel with a positive action.

In testimony whereof I have affixed my signature in presence of two witnesses.

HENRY HESS.

Witnesses:
 MARY MCCALLA,
 NETTIE L. HAHN.

Copies of this patent may be obtained for five cents each, by addressing the "Commissioner of Patents, Washington, D. C."